United States Patent Office 3,436,433
Patented Apr. 1, 1969

3,436,433
DEALKYLATION OF ALKYL SUBSTITUTED AROMATIC HYDROCARBONS
George R. Lester, Park Ridge, Ill., assignor to Universal Oil Products Company, Des Plaines, Ill., a corporation of Delaware
No Drawing. Filed Apr. 21, 1967, Ser. No. 632,527
Int. Cl. C07c 15/00, 15/04; B01j 11/06
U.S. Cl. 260—672         8 Claims

ABSTRACT OF THE DISCLOSURE

A process for dealkylating alkyl substituted aromatic hydrocarbons, particularly alkylbenzenes, utilizing a rhodium-iron-alkali metal-chromia-alumina catalyst composite.

Background of the invention

This invention relates to a process for dealkylating alkyl substituted aromatic hydrocarbons, particularly alkylbenzenes. The improved petroleum refining techniques of recent years, particularly with respect to catalytic reforming, have resulted in a substantial output of alkyl substituted aromatic hydrocarbons, especially the alkylbenzenes such as toluene, xylene, mesitylene, ethylbenzene, cumene, and the like. While the alkylbenzenes are generally desirable to impart improved antiknock characteristics to the gasoline fraction, benzene would in many instances be a more desirable and valuable product because of its fundamental and well-known utility as a building block in the field of organic chemistry. For example, benzene is in increasing demand as a starting material in the manufacture of styrene, phenol, nylon intermediates and the biodegradable alkylbenzene sulfonate detergents. An economical method for converting alkyl-benzenes into benzene would therefore be highly desirable. This is particularly true in the case of toluene which is frequently produced in much larger quantities than can be economically utilized and which is also the most difficult to dealkylate.

It is an object of this invention to present a novel process for the dealkylation of alkyl aromatic hydrocarbons, particularly alkylbenzenes. It is a further object to disclose a novel catalytic composite which is highly active with respect to the dealkylation reaction herein contemplated and possessing a high degree of selectivity and stability.

SUMMARY OF THE INVENTION

One of the embodiments of this invention relates to a catalyst composition comprising alumina having from about 0.1 to about 4 weight percent alkali metal, from about 0.2 to about 20 weight percent $Fe_2O_3$, from about 0.05 to about 2.5 weight percent rhodium, and from about 1.0 to about 60 weight percent chromia composited therewith.

The alumina component of the described catalyst composite is a high surface area alumina characterized by a surface area of at least about 50 square meters per gram, and preferably a surface area of from about 100 to about 300 square meters per gram. The alumina is suitably prepared by conventional methods described in the art. For example, an alkaline reagent, usually ammonium hydroxide, is added to an aqueous solution of an aluminum salt, such as aluminum chloride, whereby aluminum hydroxide is precipitated from the solution. Upon washing, drying and calcining at a proper temperature, say from about 540 to about 700° C. the aluminum hydroxide is converted to the desired alumina.

The other components of the catalyst can be added to the alumina in any desired order. The chromia component may be subsequently impregnated on the alumina as hereinafter described, or the chromia may be coprecipitated with the alumina to form a homogeneous composite therewith. For example, an alkaline reagent, such as ammonium hydroxide, is added to an aqueous solution of aluminum chloride and chromium nitrate whereby a coprecipitate is formed which, upon washing, drying, and calcining yields a chromia-alumina composite.

The alumina, or chromia-alumina, thus prepared may be formed into particles of uniform size and shape, for example, by commingling a pelleting agent such as hydrogenated vegetable oil, graphite, polyvinylamine, etc., with the alumina or chromia-alumina in a powdered form and compressing the mixture into pellets.

A preferred method of preparing the alumina relates to the preparation of alumina spheres and comprises digesting aluminum in aqueous aluminum chloride and/or hydrochloric acid. It is then possible to manufacture the alumina spheres by dispersing the resultant sol in the form of droplets into an oil bath maintained at an elevated temperature effecting gelation of the droplets. The resultant spherical particles are retained in the oil bath until they set into firm gel spheres. The spheres are thereafter recovered and subjected to specific aging procedures under alkaline conditions to impart desired pore volume characteristics thereto. The method is substantially as described in U.S. Patent 2,620,314 issued to James Hoekstra. Again, the chromia component may be formed composited with the alumina in a spherical shape by substantially the same method. Thus, the aluminum may be digested in aqueous chromium chloride, instead of aluminum chloride, in the presence or absence of hydrochloric acid. The resulting sol may then be further treated in substantially the same manner and at the same conditions as last described to give a spherical composite of chromia and alumina in any desired proportions.

Generally, the chromia is impregnated on the alumina, either alone or in combination with one or more of the other catalyst components, for example, by suspending, dipping, or otherwise immersing the alumina in an aqueous solution containing a suitable chromium compound, such as chromium nitrate, chromic acid, etc., which is decomposable to chromia upon subsequent calcination. The alumina is immersed in the impregnating solution for a suitable period of time during which the excess water is evaporated therefrom, or after which the excess solution is decanted therefrom. The foregoing procedure may be repeated one or more times with or without intermediate drying, to achieve the desired catalyst composition. In any case, the concentration of the impregnating solution should be such as to insure a final catalyst composite containing from about 1.0 to about 60 weight percent chromia, and preferably from about 5 to about 15 weight percent.

The alkali metal component is suitably added to the catalyst composite by treating the alumina, or chromia-alumina as the case may be, with an alkali metal hydroxide or an alkali metal salt such as lithium hydroxide, lithium nitrate, potassium hydroxide, potassium nitrate, sodium hydroxide, sodium nitrate, etc., in aqueous solution and thereafter calcining the resultant composite at from about 500 to about 700° C. whereby said hydroxide or salt is thoroughly decomposed.

The iron component may be added to the catalyst composition in a separate step or together with one or more of the other components by the impregnating technique hereinabove referred to. Thus, a soluble iron compound may be prepared in aqueous solution with or without a soluble compound of one or more of the other catalyst components and the resulting solution utilized to treat the alumina, or alumina composited with one or more of the other components. The iron concentration of the impregnating solution should be such as to insure a finished catalyst comprising from about 0.2 to about 20 weight percent $Fe_2O_3$, preferably from about 0.2 to about 10 weight percent, calculated as the oxide. Suitable iron compounds include ferrous chloride, ferric chloride, ferrous sulfate, ferric nitrate, etc. While iron has a deactivating influence, although not substantial, conversion can be maintained at a desired level by utilizing more severe reaction conditions within the ranges hereinafter set forth without impairing the improved selectivity resulting from the inclusion of iron in the catalyst composition.

It has been found advantageous to steam-treat the alumina component of the catalyst, preferably prior to the addition of the rhodium component thereto. The steam treatment is suitably accomplished by passing a steam-air-mixture in contact with the alumina for a period of from 1 to 24 hours and at a temperature of from about 550 to 750° C. The steam treatment tends to improve both the activity and stability of the finished catalyst.

The desired catalyst composition may then be obtained by treating the composite with, for example, a rhodium salt such as rhodium chloride, rhodium nitrate, etc., in aqueous solution in an amount sufficient to yield a finished catalyst composite containing from about 0.05 to about 2.5 weight percent rhodium, and preferably from about 0.3 to about 1.5 weight percent. The rhodium component of the catalyst appears to have a unique effect on the dealkylation reaction herein contemplated. For example, other noble metals, excepting platinum and palladium, are substantially ineffective as a component of the catalyst of this invention. While platinum and palladium do impart the desired activity and selectivity to the catalyst composite at substantially (about 100° C.) higher temperatures than does rhodium, the resulting catalyst is substantially unstable and not conducive to extended periods of operation as required of commercial processes. Rhodium on the other hand gives the desired stability to the catalyst and, in association with the chromia component, gives a higher degree of selectivity. Further, the rhodium is considerably more active and permits more moderate temperatures to attain equivalent conversion.

The dealkylation reaction of this invention is effected by commingling water with the alkyl aromatic hydrocarbon charge stock in a molar ratio of from about 2/1 to about 30/1 and heating the mixture in contact with the aforesaid catalyst at a temperature of from about 400° C. to about 600° C. The dealkylation reaction is suitably effected at a pressure of from about atmospheric to about 650 pounds per square inch gauge (p.s.i.g.), a pressure of from about 75 p.s.i.g. to about 400 p.s.i.g. being preferred.

The process is particularly adapted to the dealkylation of alkylbenzenes such as toluene, the xylenes, the trimethylbenzenes, ethylbenzene, cumene, and the like. Alkylbenzenes containing larger alkyl substituents can also be dealkylated as well as alkyl aromatic hydrocarbons comprising a condensed benzene nucleus such as the alkylnaphthalenes, the alkylphenanthrenes, the alkylanthracenes, etc., as well as mixtures thereof. It will be appreciated that by varying reaction conditions within the limitations set forth, the alkyl aromatic hydrocarbon may be either partially or completely dealkylated. For example, mesitylene can be converted to m-xylene.

The process of this invention may be effected in either a batch or a continuous type of operation. In the preferred continuous type of operation, the water is preferably converted to steam and commingle with the alkyl aromatic hydrocarbon charge in the stated ratio. The mixture may then be preheated and charged to a reactor containing the catalyst disposed in a fixed bed therein. The steam-hydrocarbon mixture is suitably charged to the reactor at a liquid hourly space velocity (LHSV) of from about 0.5 to about 10, a LHSV of from about 0.5 to about 2.0 being preferred. The term liquid hourly space velocity as herein employed is defined as the units of liquid volume of charging material, measured at standard conditions, which are passed per hour through the reaction zone per unit volume of catalyst contained therein. The products of the dealkylation reaction are conveniently recovered by passing the hot reactor effluent to a condenser-separator whereby the normally liquid components are condensed to form an upper hydrocarbon layer and a lower water layer, the noncondensable products, such as hydrogen, carbon monoxide, carbon dioxide, methane, ethane, etc., being discharged overhead. The hydrocarbon layer is continuously separated from the water layer, dried and fractionated to recover the desired product, with any unconverted alkyl aromatic hydrocarbon being recycled to the reactor as a portion of the hydrocarbon charge thereto. Hydrogen is a principal byproduct of the process of this invention and comprises a substantial portion of the noncondensable product. Recycle of the hydrogen permits a higher conversion of the alkyl aromatic hydrocarbon in the upper temperature range. However, conversion to the desired aromatic products, or selectivity, is adversely affected as is catalyst stability.

The following examples are presented in illustration of the present invention and are not intended as an undue limitation on the generally broad scope of the invention as set out in the appended claims.

Example I

A catalyst composite containing about 0.9% rhodium, 10% chromia, 2% potassium oxide and 1.0% $Fe_2O_3$ in an alumina support was prepared in the following manner: A previously calcined alumina was treated in contact with a mixture of 40 mole percent water and 60 mole percent air at a temperature of 600° C. for a period of 12 hours. The steam treated alumina (36.1 g.) was then slurried in an aqueous solution of 5.6 grams of $CrO_3$ and 2.0 grams of $Fe(NO_3)_3 \cdot 9H_2O$. The slurry was evaporated to dryness, further dried at 250° C., and calcined at 650° C. An aqueous solution of $KNO_3$ (1.8 grams) and $RhCl_3 \cdot 3H_2O$ (0.81 gram) was utilized to impregnate the calcined particles which were thereafter dried and further calcined at 550° C. for 2 hours.

About 25 cubic centimeters of the catalyst (ground to 40–60) was placed in a fixed bed of a vertical tubular reactor and reduced in hydrogen at 570° C. Thereafter, steam was charged to the reactor in a 20/1 mole ratio with toluene, the latter being charged at a liquid hourly space velocity of about 1.0. The reactor temperature was maintained at 440° C. and the pressure at 250 p.s.i.g. The charge was passed downwardly through the catalyst bed and the reactor effluent collected in a condenser. The total conversion of toluene to benzene was 50.4%, the selectivity being about 94.9%. This activity level was maintained over a period in excess of 100 hours. The liquid product analyzed 44.9 wt. percent benzene and 55.1 wt. percent toluene by gas-liquid chromatography. The gaseous product analyzed 68.3 mole percent hydrogen, 7.6 mole percent methane and 24.1 mole percent carbon dioxide.

I claim as my invention:

1. A catalyst composition comprising alumina having from about 0.1 to about 4 weight percent alkali metal, from about 0.2 to about 20 weight percent $Fe_2O_3$, from about 0.05 to about 2.5 weight percent rhodium and from about 1.0 to about 60 weight percent chromia composited therewith.

2. The catalyst composition of claim 1 further characterized in that said rhodium comprises from about 0.3 to about 1.5 weight percent of the catalyst composite.

3. The catalyst composition of claim 2 further characterized in that said alkali metal is potassium.

4. A process for the dealkylation of an alkyl aromatic hydrocarbon which comprises commingling water with said hydrocarbon in a molar ratio in from about 2/1 to about 30/1 and heating the mixture at a temperature of from about 400° C. to about 600° C. in contact with a catalyst composition comprising alumina having from about 0.1 to about 4 weight percent alkali metal, from about 0.2 to about 20 weight percent $Fe_2O_3$, from about 0.05 to about 2.5 weight percent rhodium and from about 1.0 to about 60 weight percent chromia composited therewith.

5. The process of claim 4 further characterized in that said rhodium comprises from about 0.3 to about 1.5 weight percent of said catalyst composition.

6. The process of claim 5 further characterized in that said alkali metal is potassium.

7. The process of claim 6 further characterized in that said alkyl aromatic hydrocarbon is an alkylbenzene.

8. The process of claim 7 further characterized in that alkylbenzene is toluene.

References Cited

UNITED STATES PATENTS

| 3,222,132 | 12/1965 | Dowden | 23—212 |
| 3,306,944 | 2/1967 | Pollitzer | 260—672 |

DELBERT E. GANTZ, *Primary Examiner.*

G. E. SCHMITKONS, *Assistant Examiner.*

U.S. Cl. X.R.

252—465